United States Patent Office 3,268,582
Patented August 23, 1966

3,268,582
PHENYLALKYL-CARBOXYLIC ACID AMIDES
Karl Zeile and Karl Heinz Hauptmann, Ingelheim (Rhine), Germany, assignors to Boehringer Ingelheim Gesellschaft mit beschrankter Haftung, Ingelheim (Rhine), Germany, a corporation of Germany
No Drawing. Filed May 7, 1963, Ser. No. 278,739
Claims priority, application Germany, Aug. 4, 1961, B 63,532
5 Claims. (Cl. 260—559)

This is a continuation-in-part of copending application Serial No. 208,918, filed July 10, 1962, now abandoned.

This invention relates to phenylalkyl-carboxylic acid amides and to various methods of preparing such compounds.

More particularly, the present invention relates to compounds of the formula

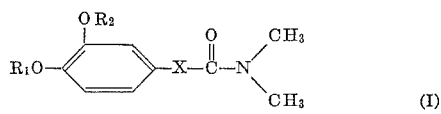

(I)

wherein $R_1$ and $R_2$ are each selected from the group consisting of methyl and ethyl and
X is alkylene of 1 to 2 carbon atoms.

The phenylalkyl-carboxylic acid amides of the present invention may be prepared by a variety of methods which involve process steps that are well known in principle. However, the following methods have been found to be especially convenient and efficient.

METHOD A

Reaction of a phenylalkyl-carboxylic acid halide of the formula

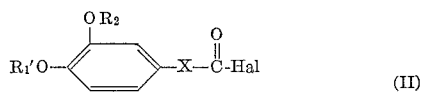

(II)

wherein $R_2$ and X have the meanings defined above in connection with Formula I, $R_1'$ is alkyl of 1 to 2 carbon atoms or a radical which may readily be split off and replaced by a hydrogen atom, such as an aryl or benzyl group, and Hal is a halogen, with dimethylamine.

The reaction between compound II and dimethylamine is advantageously carried out in the present of an inert organic solvent, such as dioxane, methanol or ethanol, at temperatures of 10 to 100° C. In order to tie up and neutralize the hydrogen halide liberated by the reaction, the dimethylamine is advantageously provided in molar excess over the stoichiometric quantity required for complete reaction with the carboxylic acid halide II. In other words, if the reaction is to be carried with one mol of the carboxylic acid halide II, at least 2 mols of dimethylamine should be provided, that is, one mol to react completely with the carboxylic acid halide and at least one more mol to neutralize and tie up the mol of hydrogene halide liberated by the reaction.

After the reaction has gone to completion the inert organic solvent is driven off by evaporation, the residue is dissolved in water, the resulting aqueous solution is made alkaline, and the phenylalkyl-carboxylic acid amide reaction production is extracted with the aid of an inert organic solvent, which is immiscible with water, such as benzene. The pure reaction product may then be recovered from the extract solution by high-vacuum distillation or recrystallization.

METHOD B

Reaction of a phenylalkyl-carboxylic acid of the formula

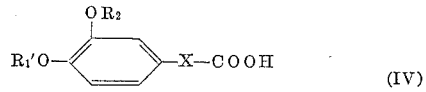

(IV)

wherein $R_1'$, $R_2$ and X have the meanings previously defined, with a dimethyl carbamyl halide of the formula

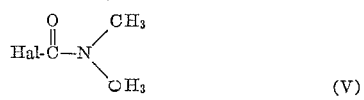

(V)

wherein Hal is a halogen.

The reaction between compounds IV and V is advantageously carried out at temperatures between 50 and 150° C. and without the addition of solvents or diluents. The reaction mixture is worked up and the reaction product isolated in the same manner as set forth in Method A.

If it is desired to prepare compounds of the Formula I wherein $R_1$ and $R_2$ are different from each other, that is, compounds wherein $R_1$ is methyl and $R_2$ is ethyl or vice versa, the starting material in Methods A and B may also be a compound of the Formula II or IV wherein $R_1'$ is a substituent which may readily be transformed into hydrogen. These starting compounds are reacted with dimethylamine or a dimethylcarbamyl halide V, the reaction product is hydrolized to form a free hydroxyl group in the 4-position of the phenyl ring, and the 4-hydroxy-phenyl compound is then alkylated by customary methods with a suitable alkylating agent, such as an alkyl halide or an alkyl sulfate, comprising the desired alkyl group.

The following examples shall further illustrate the present invention and enable others skilled in the art to understand it more completely. It should be understood, however, that the invention is not limited solely to these particular examples.

*Example I.—Preparation of (3,4-dimethoxy-phenyl)-acetic acid-N,N-dimethylamine by Method B*

39.2 gm. (0.2 mol) of (3,4-dimethoxy-phenyl)-acetic acid were admixed with 32 gm. (0.3 mol) of N,N-dimethyl-carbamylchloride, and the resulting mixture was stirred for one hour at room temperature. Thereafter, the mixture was heated for five hours at 100° C. The reaction mass was then admixed with 6 N sodium hydroxide until alkaline, and the resulting alkaline solution was shaken three times with separate portions of benzene. The benzene extract solutions were combined and washed with a saturated aqueous sodium chloride solution. Thereafter, the benzene was evaporated and the residue was distilled under a vacuum of 0.05 mm. Hg. The fraction passing over between 150 and 155° C. was collected and was analyzed to be (3,4-dimethoxy-phenyl)-acetic acid-N,N-dimethylamide of the formula

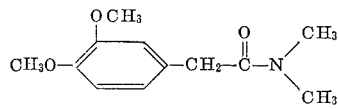

The yield was 26.2 gm. (59% of theory).

*Example II.—Preparation of (3,4-dimethoxy-phenyl)-acetic acid-N,N-dimethylamide by Method A*

196 gm. (1.0 mol) of (3,4-dimethoxy-phenyl)-acetic acid were dissolved in 400 cc. of benzene, and the resulting solution was admixed with 90 cc. (1.2 mols) of thionylchloride. The resulting reaction mixture was carefully heated at 60° C. on a water bath for about three hours. Thereafter, the benzene solvent and unreacted thionylchloride were removed by vacuum distillation. In order to ensure complete removal of thionylchloride, the vacuum distillation residue was again admixed with 100 cc. of benzene and the mixture was again subjected to vacuum distillation; residual trace amounts of thionylchloride were thereby removed by entrainment with the evaporating benzene. The evaporation residue consisted essentially of 1 mol of (3,4-dimethoxy-phenyl)-acetic acid chloride.

This residue was dissolved in a small amount of dioxane, and the resulting solution was added to a solution of 150 cc. (2.0 mols) of dimethylamine in 500 cc. of dioxane, accompanied by cooling and vigorous stirring. The resulting reaction mixture was stirred for five hours at room temperature and then for three hours at 60° C. Subsequently, the dioxane and the excess dimethylamine were distilled off in vacuo, and the distillation residue was dissolved in water. The resulting aqueous solution was purified with charcoal, filtered and admixed with an aqueous 48% solution of sodium hydroxide until akaline. An immiscible liquid separated out and collected at the surface of the alkaline solution, which was extracted with benzene. The benzene extract solution was dried, the solvent was evaporated, and the residue was subjected to distillation under a vacuum of 0.05 mm. Hg. The fraction passing over between 150 and 155° C. was collected and was identified to be (3,4-dimethoxy-phenyl)-acetic acid-N,N-dimethylamide of the formula shown in Example I. The yield was 187 gm. (80% of theory).

*Example III.—Preparation of (3-methoxy-4-ethoxy-phenyl)-acetic acid-N,N-dimethylamide*

10. gm. of (3-methoxy-4-acetoxy-phenyl)-acetic acid were dissolved in 50 cc. of benzene, and the resulting solution was admixed with 5 cc. of thionylchloride. The reaction mixture thus formed was then heated for four hours at 60° C. until no more evolution of $SO_2$ could be detected. Thereafter, the benzene solvent and any unreacted thionyl-chloride were distilled off in vacuo at the lowest possible distillation temperature. The residue consisted essentially of (3-methoxy-4-hydroxy-phenyl)-acetic acid chloride.

The distillation residue was dissolved in a small amount of dioxane, and the resulting solution was admixed with a solution of 15 cc. of dimethylamine in 100 cc. of dioxane at a temperature of 10° C. The mixture was allowed to stand overnight at room temperature, and the dioxane solvent was distilled off in vacuo. The distillation residue was taken up in 50 cc. of water, the resulting solution was filtered through charcoal, the aqueous filtrate was made strongly alkaline with a 6 N aqueous solution of sodium hydroxide, and the alkaline solution was heated for some time on a water bath. Thereafter, the solution was made acid with hydrochloric acid, and the reaction product was salted out with sodium chloride and extracted with benzene. The benzene was distilled out of the extract solution and the distillation residue was again distilled in a high vacuum of 0.1 mm. Hg. The fraction passing over at 164° C. was collected and identified to be (3-methoxy-4-hydroxy-phenyl)-acetic acid-N,N-dimethylamide of the formula

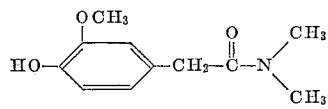

The yield was 7.5 gm. After recrystallization from a mixture of chloroform and ether the product had a melting point of 92.5–93.5° C.

The (3-methoxy-4-hydroxy-phenyl)-acetic acid-N,N-dimethylamide thus obtained was dissolved in 55 cc. of 2 N aqueous sodium hydroxide, and the resulting solution was admixed over the course of about half an hour at a temperature of 45° C. with 13.3 cc. of diethyl sulfate. The resulting mixture was then allowed to stand for two hours at room temperature. Thereafter, it was made strongly alkaline with an aqueous 48% solution of sodium hydroxide, and the alkaline solution was exhaustively extracted with chloroform. The chloroform extract solution was distilled to remove the chloroform, and the residue was again distilled under a pressure of 0.1 mm. Hg. The fraction passing over between 147 and 150° C. was collected and identified to be (3-methoxy-4-ethoxy-phenyl)-acetic acid-N,N-dimethylamide of the formula

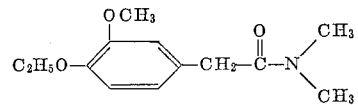

The yield was 18.7 gm.

*Example IV.—Preparation of β-(3,4-dimethoxy-phenyl)-propionic acid-N,N-dimethylamide by Method A*

14 gm. (0.15 mol) of β-(3,4-dimethoxy-phenyl)-propionic acid (M.P.=96° C.) were dissolved in about 0.1 mol of thionyl chloride, and the resulting solution was carefully heated on a water bath until the chlorination reaction was initiated, which was evidenced by the evolution of $SO_2$. When the evolution of $SO_2$ had ceased, the excess thionyl chloride was removed from the reaction mixture by distillation in vacuo. The distillation residue was dissolved in 100 cc. of benzene, and the resulting solution was again distilled to remove the benzene and any residual traces of thionyl chloride. The residue consisted essentially of β-(3,4-dimethoxy-phenyl)-propionic acid chloride.

This residue was dissolved in a small amount of dioxane, and the resulting solution was slowly stirred into a solution of 10 gm. (0.22 mol) of dimethylamine in 100 cc. of dioxane, accompanied by exterior cooling with ice. The reaction mixture was then stirred for five hours at room temperature and for four hours at 60° C. Thereafter, the dioxane and the excess dimethylamine were distilled off in vacuo and the residue was dissolved in benzene. The benzene solution was washed with an aqueous sodium bicarbonate solution and then with water until free from acid. The washed residue was finally distilled in vacuo under a pressure of 0.1 mm. Hg. The fraction passing over between 150 and 152° C. was collected and identified to be β-(3,4-dimethoxy-phenyl)-propionic acid-N,N-dimethylamide of the formula

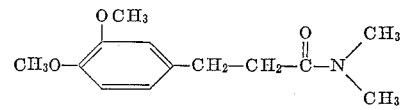

The yield was 14.6 gm. (90% of theory).

*Example V.—Preparation of β-(3,4-dimethoxy-phenyl)-propionic acid-N,N-dimethylamide by Method B*

Using a procedure analogous to that described in Example I, β-(3,4-dimethoxy-phenyl)-propionic acid-N,N-dimethylamide was prepared from 1 mol of β-(3,4-dimethoxy-phenyl)-propionic acid and 1.5 mols of N,N-dimethyl-carbamyl chloride. The yield was 53% of theory.

*Example VI.—Preparation of (3,4-dimethoxy-phenyl)-α-methyl-acetic acid-N,N-dimethylamide by Method A*

20.2 gm. of (3,4-dimethoxy-phenyl)-α-methyl-acetic acid were dissolved in 50 cc. of warm benzene, and the resulting solution was admixed with 1 cc. of dimethylformamide and 20 cc. of thionylchloride. The reaction mixture thus obtained was heated on a water bath to 50–60° C. and was maintained at that temperature for four hours. Thereafter, the benzene and the excess thionyl chloride was distilled off, and the residual (3,4-dimethoxy-phenyl)-α-methyl-acetic acid chloride was taken up in dioxane. The resulting solution was added dropwise to a 5% solution of dimethylamine in dioxane, and the mixture was then heated for five hours at 50–60° C. Thereafter, the dioxane was distilled off, the distillation residue was taken up in ether, and the ether solution was washed with hydrochloric acid and water until neutral. The ether was distilled off, and the residue was subjected to fractional distillation. The fraction passing over at 146–150° C./0.4 mm. Hg was identified to be (3,4-dimethoxyphenyl)-α-methyl-acetic acid-N,N-dimethylamide of the formula

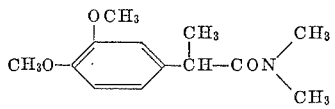

The yield was 15.3 gm. (67.5% of theory).

The compounds according to the present invention, that is, those embraced by Formula I above, have useful pharmacological properties. More particularly, they are exceptionally effective respiratory analeptics with very low toxicity and, even in large doses, exhibit no spasmodic activity. Therefore, the compounds of the present invention are unexpectedly and substantially superior to known compounds of similar structure which have respiratory analeptic properties, such as vanillic acid-N,N-diethyl-amide.

For therapeutic purposes, the compounds of the present invention are administered in amounts of 1 to 200 mgm., preferably 5 to 100 mgm.; most advantageously, they are administered in these quantities as active ingredients of dosage unit compositions, such as hypodermic solutions, drops, tablets, coated pills, syrups and the like, that is, in admixture with conventional pharmaceutical carriers. Especially preferred are solutions in distilled water.

The following examples illustrate typical such dosage unit compositions in liquid form. The parts are parts by weight unless otherwise specified.

*Example VII.—Hypodermic solution*

The solution is compounded from the following ingredients:

|   | Parts |
|---|---|
| (3,4 - dimethoxy-phenyl)-acetic acid-N,N-dimethylamide | 10.0 |
| Sodium chloride (anal. pure) | 7.5 |
| Double-distilled water, q.s. ad. 1000.0 parts by vol. |   |

*Compounding procedure.*—The amide and the sodium chloride are dissolved in the distilled water, the solution is filled into 1 cc.-ampules, the ampules are sterilized for 20 minutes at 120° C. in an autoclave and then sealed. Each ampule contains 10 mgm. of the active ingredient.

*Example VIII.—Drops*

The drop solution is compounded from the following ingredients:

(3,4-dimethoxy-phenyl)-acetic acid-N,N-dimethylamide, 75.0 parts
Distilled water, q.s. ad. 1500.0 parts by vol.

*Compounding procedure.*—The amide is dissolved in the distilled water and the resulting solution is filled into bottles of any convenient volume. 1 ml. (20 drops) of the solution contains 50 mgm. of the active ingredient.

Obviously, any of the other compounds embraced by Formula I above may be substituted in Examples VII and VIII for the particular amide used as the active ingredient therein. Moreover, the quantities of the active ingredient may be varied within the dosage unit limitations given above to suit the needs.

While we have illustrated our invention with the aid of certain specific embodiments, it will be readily apparent to others skilled in the art that the invention is not limited to these embodiments and that various changes and modifications may be made without departing from the spirit of the invention or the scope of the appended claims.

We claim:

1. A phenylalkyl-carboxylic acid amide of the formula

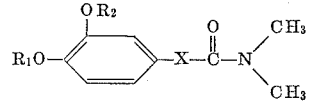

wherein
$R_1$ and $R_2$ are each selected from the group consisting of methyl and ethyl, and
X is alkylene of 1 to 2 carbon atoms.

2. (3,4 - dimethoxy - phenyl) - acetic acid - N,N - dimethylamide.

3. (3 - methoxy - 4 - ethoxy - phenyl) - acetic acid-N,N-dimethylamide.

4. β - (3,4 - dimethoxy - phenyl) - propionic acid-N,N-dimethylamide.

5. (3,4 - dimethoxy - phenyl) - α - methyl - acetic acid-N,N-dimethylamide.

References Cited by the Examiner

UNITED STATES PATENTS

| 2,937,118 | 5/1960 | Haxthausen et al. | 167—65 |
| 2,987,544 | 6/1961 | Horrom | 260—559 |
| 3,006,918 | 10/1961 | Jongh et al. | 260—559 X |
| 3,036,128 | 5/1962 | Moffett | 260—559 |
| 3,063,902 | 11/1962 | Gray et al. | 167—65 |

WALTER A. MODANCE, *Primary Examiner.*

NICHOLAS RIZZO, NATALIE TROUSOF,
*Examiners.*